United States Patent Office
3,493,405
Patented Feb. 3, 1970

3,493,405

SEMICONDUCTOR ENCAPSULATION GLASS

George L. Thomas, Bay Village, Ohio, assignor to General Electric Company, a corporation of New York No Drawing. Filed Aug. 7, 1967, Ser. No. 658,586
Int. Cl. C03c 27/00, 3/30
U.S. Cl. 106—53 4 Claims

ABSTRACT OF THE DISCLOSURE

A low softening point, low expansion, alkali free encapsulation glass for sealing to Kovar and molybdenum components of semiconductor devices contains lead oxide, silica, alumina, zinc oxide and boric oxide.

BACKGROUND OF THE INVENTION

Field of the invention

The present invention relates to non-contaminating encapsulation glasses for semiconductor devices.

Description of the prior art

Glass encapsulated semiconductor devices wherein the encapsulating glass is hermetically sealed to electrical components of the device to protect the device against harmful impurities, such as water vapor, from the atmosphere are now known in the art. With such devices including components consisting of low expansion metals, that is, metals of coefficient of expansion of about $47\times10^{-7}$ to $55\times10^{-7}$, such as molybdenum or Kovar (54% iron, 31% nickel, 15% cobalt), a hard (low expansion, high softening point) glass has been used to seal to such metals. The elevated temperatures (about 1100° C.) required to soften such low expansion glass in making the hermetic seal is harmful to the silicon or germanium components of semiconductor devices which are sensitive to temperatures of 300° C. or even lower. Complicated structures and procedures have been employed heretofore to protect the temperature sensitive semiconductor components from excessive temperatures during manufacture of such devices.

Further, such hard glasses frequently contain alkalies such as sodium oxide, lithium oxide and potassium oxide which cause the semiconductor device to short out and to terminate its useful life.

Recently such semiconductor devices have been encapsulated in an alkali free glass which coats the components of the device, seals to the low expansion metal parts thereof and which is capable of forming in situ within a temperature range which is harmless to the temperature sensitive parts of the device a protective gastight enclosure. Glasses of this kind are disclosed and claimed in copending application Ser. No. 567,834, filed July 26, 1966 now U.S. Patent 3,441,422, which is a continuation-in-part of the application Ser. No. 491,899, filed Sept. 30, 1965 now abandoned. Both of the copending applications are assigned to the assignee of the present application.

The hard glasses used for encapsulation heretofore have been in the form of tubes or beads cut from tubes, whereas the coating glasses of the copending applications are powdered glasses applied by conventional coating techniques to the semiconductor devices. While the coating glasses have simplified to a marked extent the manufacture of such encapsulated devices by eliminating the need for protecting the temperature sensitive components of such devices from excessively high temperatures during manufacture, the preparation of the powdered glass per se is not as inexpensive as the manufacture of the hard glass tubing.

SUMMARY OF THE INVENTION

The principal object of the present invention is to provide alkali free encapsulation glasses capable of being drawn into tubing by conventional tube drawing techniques and which are capable of hermetically sealing to Kovar and molybdenum at temperatures harmless to the temperature sensitive parts of semiconductor devices. Further objects and advantages will appear from the following description of the preferred embodiments of the invention.

Accordingly, the novel glass contains no alkali oxides, has a viscosity range suitabe for drawing on a conventional tube drawing equipment, does not devitrify on reworking or during tube drawing, has electrical characteristics suitable for such semiconductor devices and has a viscosity-temperature relationship which permits the use of present sealing equipment used for devices including tubing or beads made from tubing and sealing temperatures substantially lower than used heretofore in connection with such tubing or bead encapsulated devices.

DESCRIPTION OF THE PREFERRED EMBODIMENTS

I have discovered that glasses which satisfy the above requirements have substantially the following limits in weight percentages as calculated from the batch:

| | Percent |
|---|---|
| $SiO_2$ | 25–40 |
| $Al_2O_3$ | 4–15 |
| $B_2O_3$ | 0–15 |
| PbO | 45–60 |
| ZnO | 2–8 |
| $Sb_2O_3$ | 0–1 |

A specific example of a glass of the present invention which has been found satisfactory is the following in weight percent:

| | Percent |
|---|---|
| $SiO_2$ | 32.1 |
| $Al_2O_3$ | 6.0 |
| $B_2O_3$ | 6.0 |
| PbO | 51.9 |
| ZnO | 3.5 |
| $Sb_2O_3$ | 0.5 |

Another specific example of a glass of the present invention is the following in weight percent:

| | Percent |
|---|---|
| $SiO_2$ | 27.2 |
| $Al_2O_3$ | 11.7 |
| $B_2O_3$ | 5.0 |
| PbO | 51.8 |
| ZnO | 3.8 |
| $Sb_2O_3$ | 0.5 |

The physical properties of the glasses having the above specific compositions are the following, the glass of the first specific example being designated as Glass No. 1 and that of the second specific example as Glass No. 2.

| | Glass No. 1 | Glass No. 2 |
|---|---|---|
| Coefficient of expansion (0-300) $\times10^{-7}$/° C. | 51.5 | 48.8 |
| Softening point, ° C. | 637 | 683 |
| Annealing point, ° C. | 487 | 523 |
| Strain point, ° C. | 448 | 480 |
| Density, gm./cc. | 4.11 | 4.06 |
| Electrical resistivity, $\log_{10}$ ohm x cm. | | |
| 250° C. | 12.5 | 11.8 |
| 300° C. | 11.4 | 10.9 |
| 350° C. | 10.5 | 10.2 |

A batch suitable for producing the glass of the first specific example is the following in parts by weight:

| | |
|---|---|
| Sand | 62 |
| Lead bisilicate | 1000 |
| Boric acid | 134 |
| Aluminum hydrate | 100 |
| Zinc oxide | 44 |
| Antimony oxide | 6 |

A batch suitable for producing glass of the second specific example is the following in parts by weight:

| | |
|---|---|
| Lead bisilicate | 1000 |
| Boric acid | 112 |
| Aluminum hydrate | 209 |
| Zinc oxide | 48 |
| Antimony oxide | 6 |

The glass batches are melted by heating to 1400° C. under oxidizing conditions in a tank furnace for a time sufficient to form the glasses.

After melting, the glass is formed into tubing by conventional equipment which includes a tapered downwardly inclined rotating mandrel on the larger upper end of which a stream of molten glass falls from the glass melting furnace and the glass is drawn continuously from the smaller mandrel end in the form of tubing of desired diameter. The drawn tubing may be divided into lengths which may be heated and drawn into longer lengths of a smaller diameter which may be subdivided in the form of beads or short tubular sleeves useful in semiconductor encapsulation. The glass does not devitrify during tube drawing, during subsequent reworking into beads or sleeves, or during sealing to low expansion metals.

The proportions of the essential constituents of the glass disclosed above cannot be changed without loss of some of the essential physical properties. For example, more than 15% of boric oxide in the glass results in a glass unsuitable for forming tubing by the continuous tube drawing equipment described above, such equipment being the most efficient for glass tube drawing purposes. The presence of zinc oxide in the disclosed proportions reduces the coefficient of expansion and improves the workability of the glass. A higher concentration of antimony trioxide than that disclosed above has an unfavorable effect upon the electrical characteristics of the encapsulated semiconductor device.

It is contemplated that the glass of the present invention, while eminently satisfactory for encapsulation of semiconductor devices, as described above, may be used in making glass-to-glass and glass-to-metal seals for use in semiconductor or other electrical devices in which glasses or metals having coefficients of thermal expansion compatible with that of the glass of the present invention are used.

What I claim as new and desire to secure by Letters Patent of the United States is:

1. An alkali free semiconductor encapsulation glass having a softening point of about 637° C. to about 683° C., a coefficient of expansion of approximately $48.8 \times 10^{-7}$ to $51.5 \times 10^{-7}$ and an electrical resistance of approximately 11.8 to 12.5 $\log_{10}$ ohm×cm. at 250° C., said glass consisting essentially in weight percent of:

| | Percent |
|---|---|
| $SiO_2$ | 25–40 |
| $Al_2O_3$ | 4–15 |
| $B_2O_3$ | 0–15 |
| PbO | 45–60 |
| ZnO | 2–8 |
| $Sb_2O_3$ | 0–1 |

2. A glass according to claim 1 wherein the constituents are in the following weight percent:

| | Percent |
|---|---|
| $SiO_2$ | 32.1 |
| $Al_2O_3$ | 6.0 |
| $B_2O_3$ | 6.0 |
| PbO | 51.9 |
| ZnO | 3.5 |
| $Sb_2O_3$ | 0.5 |

3. A glass according to claim 1 wherein the constituents are in the following weight percent:

| | Percent |
|---|---|
| $SiO_2$ | 27.2 |
| $Al_2O_3$ | 11.7 |
| $B_2O_3$ | 5.0 |
| PbO | 51.8 |
| ZnO | 3.8 |
| $Sb_2O_3$ | 0.5 |

4. A hollow member for encapsulation of semiconductor devices including electrical conductors of metal having a coefficient of expansion of approximately $45 \times 10^{-7}$ to $55 \times 10^{-7}$, said member being sealable to said conductors and consisting of alkali free glass having a coefficient of expansion of about $48.8 \times 10^{-7}$ to $51.5 \times 10^{-7}$ and consisting essentially in weight percent of:

| | Percent |
|---|---|
| $SiO_2$ | 25–40 |
| $Al_2O_3$ | 4–15 |
| $B_2O_3$ | 0–15 |
| PbO | 45–60 |
| ZnO | 2–8 |
| $Sb_2O_3$ | 0–1 |

References Cited

UNITED STATES PATENTS

| | | | |
|---|---|---|---|
| 3,241,010 | 3/1966 | Eddleston | 317—234 |
| 3,247,428 | 4/1966 | Perri et al. | 317—234 |
| 3,264,712 | 8/1966 | Hayashi et al. | 317—234 |
| 3,303,399 | 2/1967 | Hoogendoorn et al. | 106—53 XR |
| 3,369,961 | 2/1968 | Dalton et al. | 106—53 |

HELEN M. McCARTHY, Primary Examiner

U.S. Cl. X.R.

161—177, 196; 317—234